Dec. 16, 1969   R. L. HALL   3,484,827
MODULAR RAILING SYSTEM
Filed June 3, 1968   2 Sheets-Sheet 2
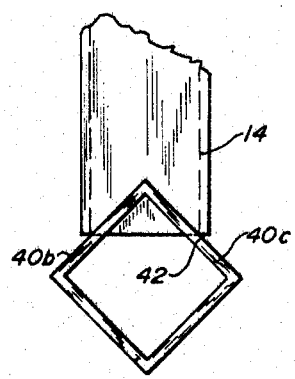
Fig_6
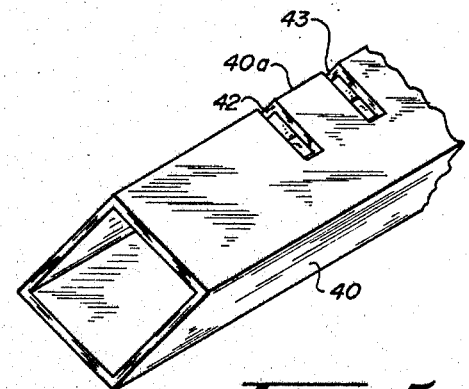
Fig_5
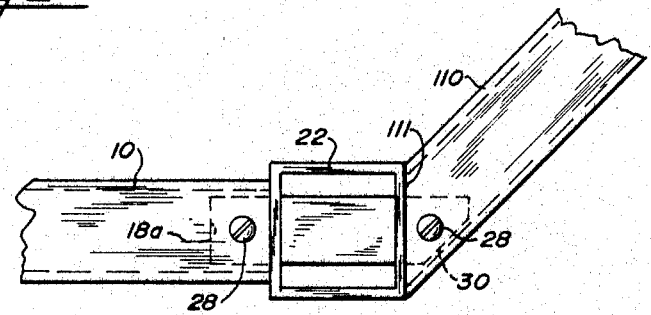
Fig_3
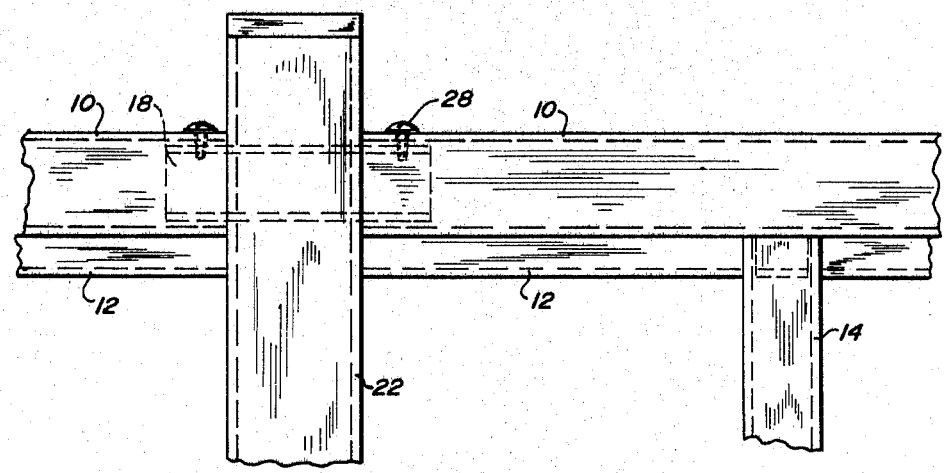
Fig_4
INVENTOR.
RAYMOND L. HALL
BY
Ralph R. Roberts
AGENT.

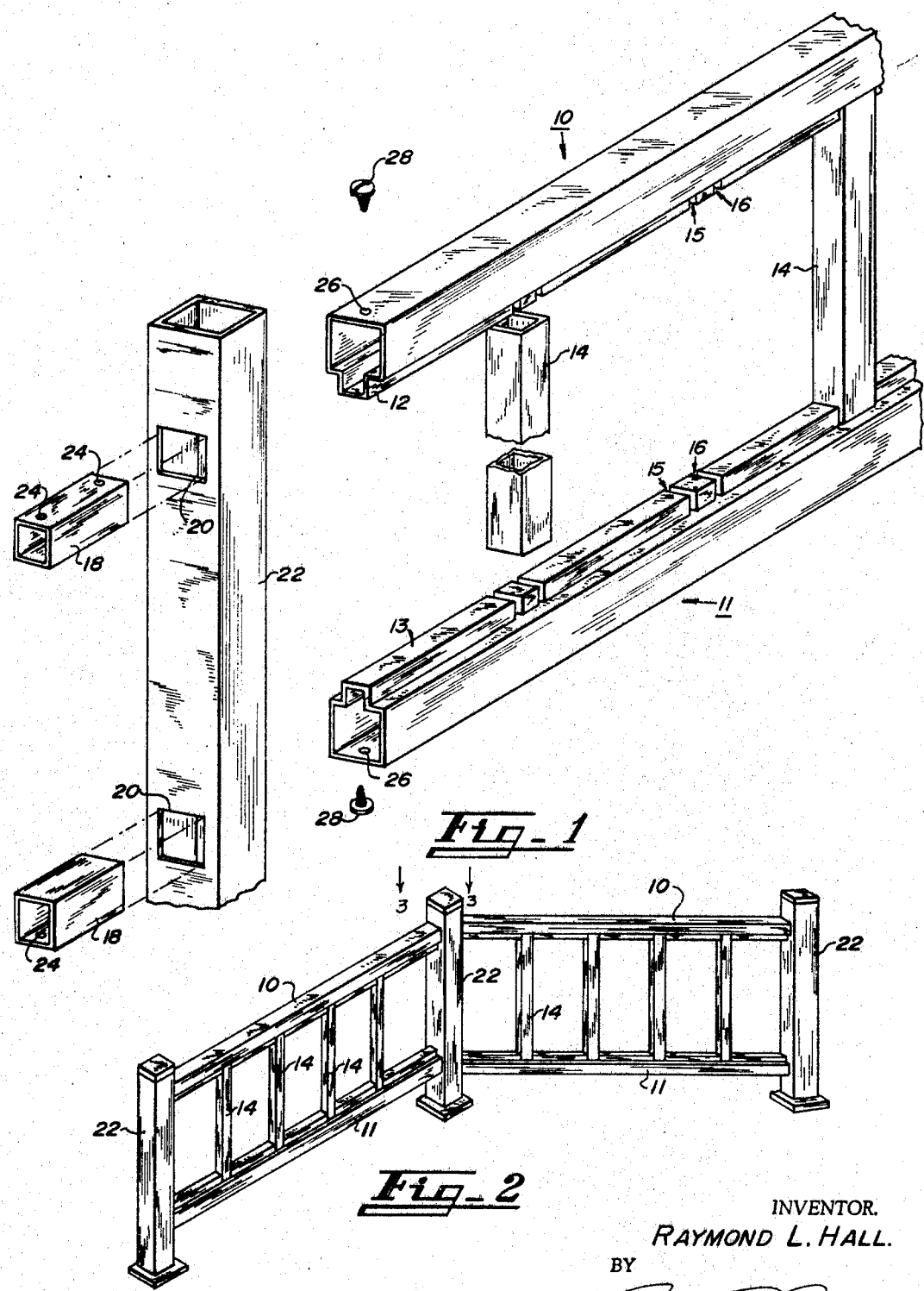

United States Patent Office 3,484,827
Patented Dec. 16, 1969

3,484,827
MODULAR RAILING SYSTEM
Raymond L. Hall, Hanover, N.J.
(19 Hamilton Court, Whippany, N.J. 07981)
Filed June 3, 1968, Ser. No. 733,953
Int. Cl. E04h 17/14
U.S. Cl. 256—59                                   5 Claims

ABSTRACT OF THE DISCLOSURE

A modular railing system of metal or plastic for use with swimming pools and the like in which the rails, balusters and support posts are of extruded sections cut to a precise length. In the rails there are formed a series of pairs of saw cuts which provide recesses for the seating and retaining of the ends of the balusters or pickets of the railing system.

BACKGROUND OF THE INVENTION

Field of the invention

This invention relates to modular fence construction made from extruded sections as particularly found in the general class of Fences and more particularly in the subclasses of "Metallic Fences" and "Picket Fences."

Description of the prior art

Modular fence construction, of course, is not new and is disclosed in many United States and foreign patents. In particular, a modular picket fence construction is shown in U.S. Patent No. 3,315,943 to Van Den Broek, of Apr. 25, 1967, and a railing system as shown in U.S. Patent No. 3,357,681 issued to Souza, of Dec. 12, 1967. These and other railing or fence systems are disposed to utilize extruded or formed metal members which may be cut to length and which may then be assembled at the point of use to provide a substantial and decorative fence system. In the above and other U.S. patents, as well as in the general field of the art, the fences made by utilizing metal members such as extrusions often require many screws and bolts in the assembly of the balusters to the rails. Not only are these and like railing systems time consuming and expensive to assemble, but such systems using bolts and screws often diminish the strength of the components forming the railing systems. In the present invention, it is contemplated that each of the rail members be metal or plastic extrusions into which several pairs of saw cuts are precisely made. These pairs of saw cuts are sized and spaced to receive the ends of the baluster or intermediate post members which are cut to length. These saw cuts space the baluster along the rails as well as trap or retain the ends of the baluster. This method of assembly requires no bolts or screws for retaining the balusters between the rails and permits rapid inexpensive assembly.

SUMMARY OF THE INVENTION

A preferred embodiment and an alternate embodiment of a modular railing system is shown in the drawings and described in the following detailed description. This railing system includes a pair of like tubular aluminum or plastic extrusions which are used as the rail members of the fence or railing system. The balusters or intermediate posts are also preferably tubular extrusions which are cut to a precise length and then are disposed between the rails to provide the spaced balusters of the fence or railing system. In particular, in the preferred embodiment, the rails are made as a square or rectangular tubular extrusion with one wall of the extrusion being formed to include an outwardly extending channel-shape having an outer width precisely sized to engage the inside of the tubular extruded shape used as a baluster member. This rail has a plurality of double saw cuts formed in this extended channel-shape. Each double cut is precisely sized so as to receive and retain oppositely disposed sides of an end of the baluster member. The rails are disposed in a face-to-face relationship so that a plurality of balusters of determined length may be mounted in the double cuts and when the rails are brought to a determined spacing the several balusters are retained between the two rails. The rail members, with their interior rectangular configuration, are adapted to receive a rectangular, tubular connector sized so as to be slidable into the interior of the rail and by means of a screw, the rail is attached to the inserted connector.

In an alternate embodiment, a rectangular or square extrusion is used as a rail. This square extrusion is provided with a plurality of paired cuts of determined width and spacing. Each pair of cuts is made diagonally across one corner of a rectangular or square extrusion so as to provide a pair of slots which receive the ends of two opposite sides of a baluster of tubular configuration. The face portion of the rail extrusion extending between a pair of cuts receives and supports the other two end portions of the baluster member.

INTENT OF THE DISCLOSURE

There has been chosen a specific embodiment of a railing or fence system for use with a swimming pool and the like. This specific assembly system and an alternate system has been chosen for the purposes of illustration and description as shown in the accompanying drawings wherein:

BRIEF DESCRIPTION OF THE DRAWINGS

FIG. 1 represents an exploded isometric view showing the relationship of the various components forming a preferred modular railing system of this invention;

FIG. 2 represents in a reduced scale a somewhat diagrammatic isometric view showing two assembled sections of extruded railing;

FIG. 3 represents a fragmentary top view showing the rail and support post assembly of FIG. 2 in which one pair of rails is joined to the support post at an angle of forty-five degrees;

FIG. 4 represents a side view showing a typical assembly of the rails to a supporting post;

FIG. 5 represents an isometric view of an alternate rail embodiment in which the rails are of a rectangular or square tubular section and are arranged in a diagonal attitude, and FIG. 6 represents a sectional or end view showing the mounting of a baluster in the saw cuts formed in the rail of FIG. 5.

In the following description and in the claims, various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now to FIG. 1, wherein is shown upper and lower rail members 10 and 11 of like tubular configuration, these rail members are preferably an extrusion of rectangular construction in which one wall has formed therein an outwardly extending channel or tongue portion designated 12 and 13. The width of the extending channel portions 12 and 13 is of a precise size for a purpose to be hereinafter described. A plurality of balusters or intermediate posts 14 are rectanuglar or square extrusions having determined interior and exterior dimensions. The ends of the balusters are contemplated as being cut square and each baluster is of a determined length. In the channel portions 12 and 13 of rail members 10 and 11, there are formed a series of pairs of slots 15 and 16. Each slot is preferably of a width substantially the same as the thickness of a sidewall of a baluster 14. The pairs of slots are spaced so as to receive, engage and retain opposite sidewalls of a baluster 14 when the end of a baluster is brought in way of the slots 15 and 16. It is to be noted that the exterior width of the tongue 12 and 13 is substantially the same as the interior transverse width of the baluster 14.

When the end of the baluster 14 is brought in way of the slots 15 and 16, two opposite sidewalls enter the slots so that the channel or tongue portion between the slots is then disposed to engage the interior surfaces of the other two sidewalls to retain the baluster 14 when the upper and lower rails 10 and 11 are brought into a positioned and spaced relationship. The interior configuration of the rails 10 and 11 is sized so as to accept a small extrusion connector member 18. In the assembly of the rail sections, the connector members are slid through rectangular or square openings 20 formed in a support post 22. Each connector member 18 is provided with a pair of screw receiving apertures 24 formed in precise positions therein so that as a connector 18 is slid through opening 20 of post 22 one of the apertures 24 is brought in way of a hole 26 formed in the rails 10 and 11. Sheet metal screw 28 is inserted into hole 26 and threadedly engages hole 24 to fasten the connector 18 in assembled condition in the post 22.

Referring now in particular to FIG. 2, it is to be noted that the posts 22 are disposed to carry the rails 10 and 11 extending therebetween and when assembled to the support posts 22, the balusters 14 are trapped and retained by the rails 10 and 11 so as to provide a support and retaining means for the series of balusters of the railing system.

Referring next to FIG. 3, there is shown a railing assembly wherein a rail 10 extending from left to right is brought next to post 22. A connector 18a is inserted into rail 10 and through post 22 and by tightening screw 28, the connector 18a is attached to one end of the rail 10 which is then supported by the post 22. The other end of the connector 18a is beveled at 30 and a rail 110 has its one end 111 beveled at, for example, forty-five degrees. A screw 28 is then tightened to attach the end of the rail 110 to the connector 18a.

Referring next to FIG. 4, it is to be noted that in the fragmentary side view shown, an upright support post 22 has a connector 18 extending through the openings 20 and by means of sheet metal screws or self-tapping screws 28, the connector 18 is attached to the rails 10. These screws 28 are of sufficient length to extend through the wall portion of the rail 10 and into holes 24 in the connector 18 to retain the rails 10 in connector 18.

Referring finally to FIGS. 5 and 6, it is to be noted that an alternate embodiment of a railing system is represented in which a square or rectangular tubular extrusion 40 has slots 42 and 43 formed therein as by sawing. These slots are diagonally disposed so as to provide a retaining means for a baluster 14. As particularly seen in FIG. 6, the rail 40 has cuts 42 and 43 formed of a determined depth so that the portion of rail 40a therebetween is disposed to engage and retain two interior parallel faces of the baluster 14, while the exterior sidewall surfaces 40b and 40c of the rail 40 support the other end portions of the baluster or post 14.

USE AND INSTALLATION

In the rail assemblies above-described, it is to be noted that the use of extrusions is contemplated; however, other members bent to shape may be also satisfactorily used. The use of extrusions provide inexpensive precise shapes which enable mass production methods to be best utilized. For example, the railing system members shown of FIG. 1 include the extrusions 10 and 11 which have certain of the interior dimensions rather precisely maintained so that the rail 10 will snugly engage and be retained by the connector extrusion 18. The holes 20 in post 22 are likewise accurately made to snugly retain the inserted connector 18 which is readily and commercially extruded with its outer dimensional tolerances having deviations of only a few thousandths of an inch. The channel or tongue portions 12 and 13 are sized so as to snugly engage the interior dimensions of the baluster 14 to retain the baluster laterally while the saw slots 15 and 16 are accurately made and are of a determined width so as to engage the longitudinal walls of the baluster 14 to snugly retain the ends of the baluster when the rails are assembled.

Obviously the balusters 14 are preferably made of a rather precise square construction so that the posts may be assembled in any desired orientation. The balusters, of course, are cut to like lengths so that the rails may be brought to a separated and retained position on post 22 to snugly engage and retain the balusters 14. It is, of course, noted that the balusters 14 are retained strictly by the positioning and retaining of the rails 10 and 11 in spaced array rather than using any auxiliary fastening means such as screws to retain the balusters in or on either of the rails 10 and 11.

Referring now particularly to the assembly of the rails of FIGS. 5 and 6, it is noted that the saw slots 42 and 43 are preferably precisely made as to width, depth and spacing so that the end of the baluster 14 snugly enters the slots 42 and 43. With the depth of slots 42 and 43 precisely formed and controlled, the rails 40 are brought into spaced position so as to snugly engage and retain the ends of the baluster 14. In the assembly of rail 40 to a corner post (not shown), such as a post 22, it is noted that rather than having the holes for a connector such as connector 18 arranged with the sidewalls of the holes parallel to the sides of the posts as in the post 22 of FIG. 1, that the hole for the connector is turned at forty-five degrees to the sides of the posts so that the rails 40 may have their diagonally disposed corners laying in a plane parallel to the side of the support post.

Caps and support prices of conventional configuration are provided to support post 22 in the installation of the railing or fence system on a swimming pool or the like.

The members shown and described contemplate the preferred use of aluminum or magnesium extrusions; however, the use of fiber filled plastic extrusions or formed pieces may also be desirable. The particular installation, surroundings and other factors of decoration and strength will prescribe the material and configuration. If extrusions are used, they need not be hollow but may be solid, semi-solid, U-shaped and the like. Glass fiber filled plastic having a high strength factor is a material which may be satisfactorily used. The manufacturing techniques of plastic extrusion and forming are advancing so rapidly that such a material must be seriously considered as a material for the production of the modular railing system shown.

It is also to be noted that the ends of the balusters may be cut at a determined angle and the saw cuts in the rails also cut at a like angle to provide a rail system for use on stairs or slopes. Angles or corner braces may be used as means for retaining the rails to the support posts.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the modular railing system may be constructed or used.

The conception of this modular railing system and its many applications is not limited to the specific embodiments shown but departures therefrom may be made without sacrificing its chief advantages and protection is sought to the broadest extent the prior art allows.

What is claimed is:

1. A modular railing system providing fence sections which may be readily assembled and disassembled at the point of use, said railing system including: (a) a pair of rail members of a generally rectangular extrusion and having one wall formed with an outwardly extending channel portion whose extending side walls are of a precisely determined size; (b) a plurality of like double slots formed in the outwardly extending portion, the slots determinedly spaced to provide outside and inside retaining surfaces; (c) a multiplicity of balusters of generally tubular configuration and of selected lengths, the balusters cut to provide ends having at least one pair of oppositely disposed walls adapted to enter and elongitudinally retained in and on the extending channel portion of the rail by one of the double slots in the rail while the inside surfaces of the other oppositely disposed walls of the end of the baluster are engaged by the surfaces of the wall of the extending channel portion of the rail between the double slots to support and transversely retain the baluster on the rail; (d) at least two support posts disposed to support the rail members when the rail members are positioned therebetween, and means for attaching and retaining the rails to the support posts, whereby in an assembled condition the system has the pair of rails disposed with their slotted portions disposed toward each other, and with the balusters having their ends engaged and retained in the slotted portion of the extending channel portions of the rails.

2. A modular railing system as in claim 1 in which the outwardly extending sides of the channel portion are generally parallel to each other.

3. A modular railing system as in claim 1 in which the slots are sized and spaced to slidably engage the outside and inside wall surfaces of the extruded baluster.

4. A modular railing system providing fence sections which may be readily assembled and disassembled at the point of use, said railing system including: (a) a pair of rail members of a generally rectangular extrusion and having a plurality of like double slots formed diagonally across one corner of the rail, the slots determinedly spaced to provide outside and inside retaining surfaces; (b) a multiplicity of balusters of generally tubular configuration and of selected lengths, the balusters cut to provide ends having at least one pair of oppositely disposed walls adapted to enter and be longitudinally retained in and on the rail by one of the double slots in the rail while the inside surfaces of the opposite longitudinally disposed walls of the end of the baluster are engaged by the engaging outer side surfaces of the rail between the double slots to support and transversely retain the baluster on the rail; (c) at least two support posts disposed to support the rail members when the rail members are positioned therebetween, and (d) means for attaching and retaining the rails to the support posts, whereby in an assembled condition the system has the pair of rails disposed with their slotted portions facing each other, and with the balusters having their ends engaged and retained in the opposed slotted portions of the pairs of rail members.

5. A modular railing system as in claim 4 in which the rails are square extrusions and the slots are saw cuts in one corner and in which the balusters are square extrusions having like wall thicknesses.

References Cited

UNITED STATES PATENTS

| 112,887 | 3/1871 | Bent | 256—21 |
| 1,441,724 | 1/1923 | Ferris | 256—22 |
| 1,526,638 | 2/1925 | Knight | 256—22 |
| 2,150,651 | 3/1939 | Ewing | 256—22 X |
| 2,930,638 | 3/1960 | Morrissey. | |
| 3,218,036 | 11/1965 | Kozub | 256—22 |
| 3,313,527 | 4/1967 | Eriksson | 256—21 X |

FOREIGN PATENTS

| 44,864 | 11/1910 | Austria. |
| 26,405 | 4/1902 | Switzerland. |

DENNIS L. TAYLOR, Primary Examiner

U.S. Cl. X.R.

256—65